US007571162B2

(12) United States Patent
Sun et al.

(10) Patent No.: US 7,571,162 B2
(45) Date of Patent: Aug. 4, 2009

(54) COMPARATIVE WEB SEARCH

(75) Inventors: Jian-Tao Sun, Beijing (CN); Xuanhui Wang, Beijing (CN); Dou Shen, Beijing (CN); Hua-Jun Zeng, Beijing (CN); Jian Wang, Beijing (CN); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 257 days.

(21) Appl. No.: 11/365,961

(22) Filed: Mar. 1, 2006

(65) Prior Publication Data

US 2007/0208701 A1 Sep. 6, 2007

(51) Int. Cl.
*G06F 17/30* (2006.01)
*G06F 15/16* (2006.01)

(52) U.S. Cl. .................. 707/5; 707/10; 707/104.1; 705/27; 715/239

(58) Field of Classification Search ........... 707/5
See application file for complete search history.

(56) References Cited

U.S. PATENT DOCUMENTS

| 5,220,625 | A  | * | 6/1993  | Hatakeyama et al. ....... 715/809 |
| 6,119,101 | A  | * | 9/2000  | Peckover .................... 705/26 |
| 6,363,373 | B1 |   | 3/2002  | Steinkraus |
| 6,381,597 | B1 | * | 4/2002  | Lin ............................ 707/4 |
| 6,615,209 | B1 | * | 9/2003  | Gomes et al. ................. 707/5 |
| 6,684,204 | B1 |   | 1/2004  | Lal et al. |
| 6,701,309 | B1 |   | 3/2004  | Beeferman et al. |
| 6,721,736 | B1 | * | 4/2004  | Krug et al. ................... 707/5 |
| 6,738,759 | B1 | * | 5/2004  | Wheeler et al. .............. 707/3 |
| 6,832,355 | B1 |   | 12/2004 | Duperrouzel et al. |
| 6,999,959 | B1 | * | 2/2006  | Lawrence et al. ............. 707/5 |
| 7,240,049 | B2 | * | 7/2007  | Kapur .......................... 707/3 |
| 2004/0260692 | A1 | * | 12/2004 | Brill et al. .................. 707/5 |
| 2005/0102259 | A1 | * | 5/2005  | Kapur .......................... 707/1 |
| 2006/0026147 | A1 | * | 2/2006  | Cone et al. ................... 707/3 |

OTHER PUBLICATIONS

A. Nadamoto, M. Qiang and K. Tanaka, Concurrent Browsing of Bilingual Web Sites By Content Synchronization and Difference-Detection, Proceedings of the Fourth International Conference on Web Information Systems Engineering (WISE'03), pp. 189-199, Dec. 10-12, 2003.*

Akiyo Nadamoto, et al. "Concurrent Browsing of Bilingual Web Sites by Content-Synchronization and Difference-Detection," Web Information Systems Engineering, 2003. WISE 2003. Proceedings of the Fourth International Conference on Dec. 10-12, 2003. pp. 189-199.

* cited by examiner

*Primary Examiner*—Greta L Robinson
*Assistant Examiner*—Brian E Weinrich
(74) *Attorney, Agent, or Firm*—Perkins Coie LLP

(57) ABSTRACT

Methods and systems are provided for performing a comparative search. In one example, the comparative search is performed over a network, such as the web, or a database. In one exemplary implementation, a user transmits a plurality of queries which represent the topics that a user wants to compare, and a computing system can automatically retrieve and rank web pages or documents based on both their relevance to queries and the comparative contents they contain. In one such example, the comparative pages are displayed in a pair or other form of a grouping. In another example, comparative results having similar contents may be clustered into meaningful themes.

16 Claims, 3 Drawing Sheets

COMPARATIVE WEB SEARCH

BACKGROUND

Computer users frequently utilize computing devices connected to the Internet or a database of information to compare similar items. Indeed, it is quite common for users to comparison shop for products or services through the internet. For example, a user may want to compare two candidate products before he/she makes purchase decisions. Traditional search engines return a set of Web pages or documents ranked according to their relevance with an input query. While this may be useful for searching for pages and/or documents relevant to the search query, the results often do not provide the comparison information the user needs in an efficient manner, if at all.

Generally, the user is presented with any page or document containing the word(s) provided in the search query, regardless if the pages or documents that provide information useful when comparing the searched product or service with another similar product or service. This forces the user to review numerous pages that are of little significance. Indeed, even when the searched pages contain useful comparative information, the user must conduct several queries and independently determine which ones comprise similar information among the different queries. What is needed, therefore, are efficient methods and systems for performing comparative searches for two or more related items, such as products or services.

SUMMARY

Methods and systems are provided for seeking relevant and comparative information from a network or database, such as the Internet or Web. In one example, upon receiving a plurality of queries, which represent the topics that a user wants to compare, a system can automatically retrieve and rank web pages based on both their relevance to queries and the comparative contents they contain. In one example, the comparative pages are displayed in a pair or other form of a grouping.

In another example, comparative results having similar contents may be clustered into semantically meaningful themes. In order to help users easily catch the comparative contents of each theme, salient phrases may be extracted to summarize the comparative contents in each theme. In one such example, a graphical user interface may allow users to view comparative pages and comparative clusters.

These and other advantages will become apparent from the following detailed description when taken in conjunction with the drawings. A more complete understanding of the present invention and the advantages thereof may be acquired by referring to the following description in consideration of the accompanying drawings, in which like reference numbers indicate like features. The invention is being described in terms of exemplary embodiments. Numerous other embodiments, modifications and variations within the scope and spirit of the appended claims will occur to persons of ordinary skill in the art from a review of this disclosure.

DETAILED DESCRIPTION

Exemplary Operating Environment

Figure 1:
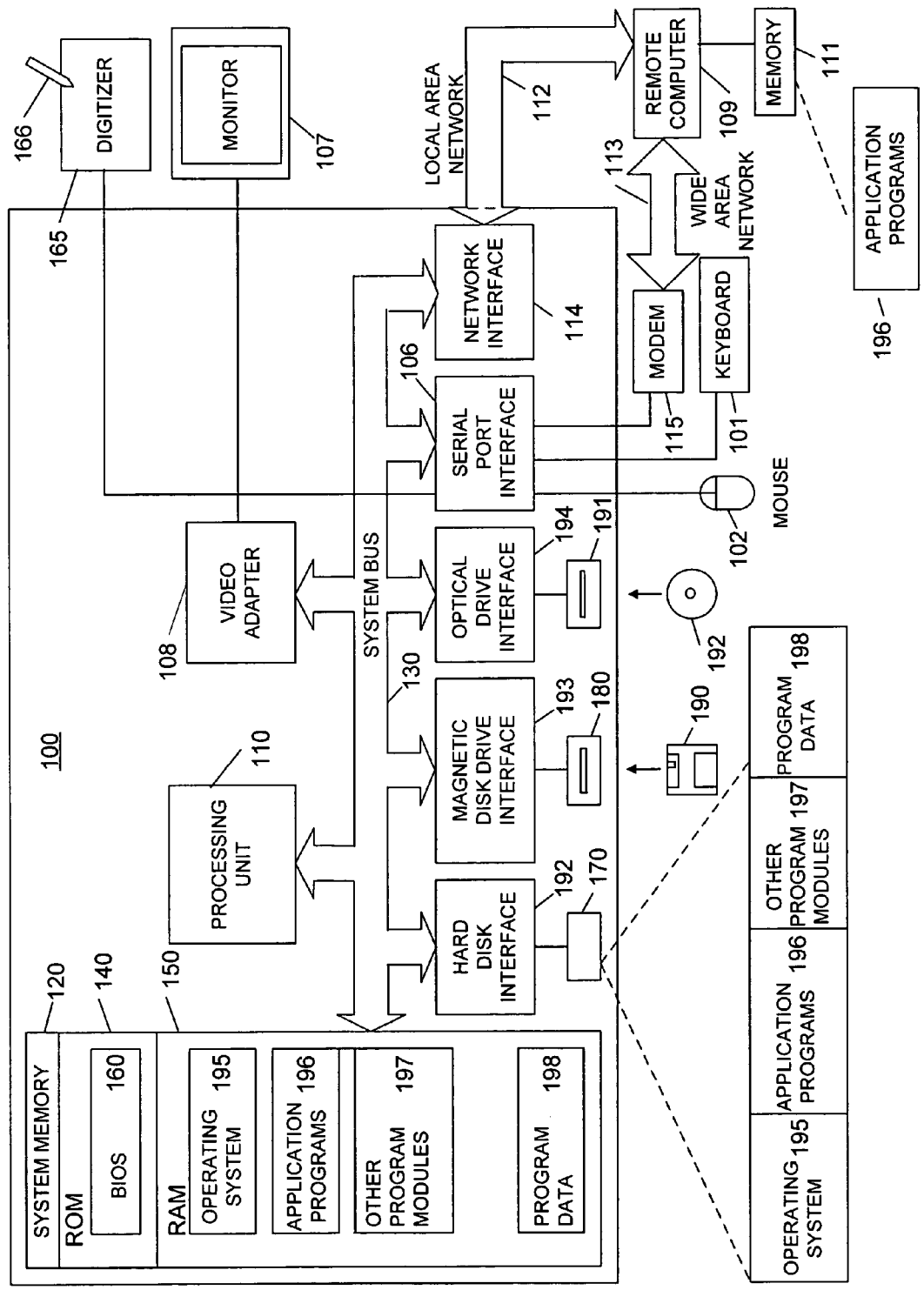
FIG. 1 illustrates an exemplary computer system in which embodiments of the invention may be implemented.

FIG. 1 is a functional block diagram of an example of a conventional general-purpose digital computing environment that can be used in connection with various input devices. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). The illustrated computer 100 includes an optional PCMCIA interface 103 that may connect at least one embodiment of an input device according to the present invention to the computer 100. Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Description of Illustrative Embodiments

Figure 2:
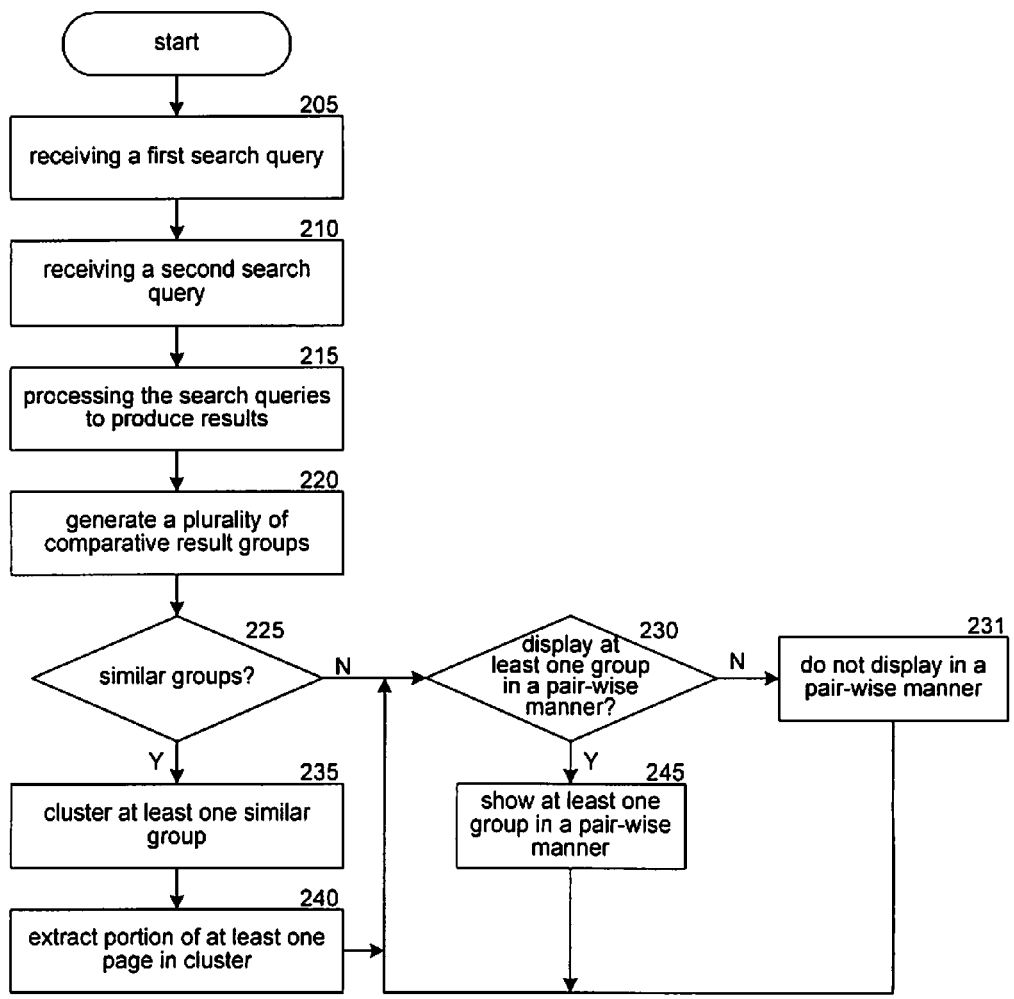
FIG. 2 is a flow diagram of an exemplary method of ranking comparative search results.

FIG. 2 is a flow diagram of an exemplary method of ranking comparative search results with one embodiment of the invention. It is to be understood that the steps described in reference to the method may be carried out in any computing device. In exemplary step 205, a first search query is received. The search query may be transmitted by a computing device having a web browser, such as Microsoft's Internet Explorer® web browser, operatively connected to the Internet through, for example, the wide area network 113. While the illustrated search in step 205 and other searches throughout the specification may be illustrated by way of reference to the internet or web, one skilled in the art will readily appreciate that the methods may be conducted among any network including an intranet.

In step 210, at least a second search query that is related to the first query is received. By related, the searches share a common subject matter. For example, the first search query could relate to the Microsoft® Xbox® game console and the second search query may relate to the Sony® Playstation®. In such an example, the searches both relate to personal gaming devices. Of course, further search queries could relate to further personal gaming devices. In this regard, the search queries allow a user to input two competing products or services the user is considering purchasing.

The second search query may also be transmitted from a browser known in the art. Alternatively, a modified browser may be utilized where a graphical user interface is presented to a user that allows the entry of two or more search queries. A user may provide the search queries on a single page or at different stages of the process. The search queries may take the form, for example, as Boolean terms or natural language. One skilled in the art understands there are a plurality of forms that the queries may be presented in, any of which may be used in conjunction with the teachings of the invention.

In exemplary step 215, the first search query is processed to produce first search results and the second search query is processed to produce second search results. In one embodiment, a Boolean and/or keyword search engines is utilized. In such an embodiment where the search queries are matched with corresponding web pages based on relevance, when a search query is submitted to the search engine, a process extracts the word tokens from the search query. In one embodiment, a search is then conducted to find documents which best match the query at a word token level. The closeness of match is most commonly based on whether the document satisfies a Boolean expression made up of the query terms, or on a weighted aggregate of the terms in both the query and the document such as the well-known "Vector Space Model" (see e.g. "Automatic Text Processing", G. Salton [Addison-Wesley, 1989], section 10.1.1). One skilled in the art will realize there are other more specific methods of processing search queries.

While the exemplary step processes the first and the second search query in the same step, one skilled in the art will readily appreciate the search queries may be processed at different times by different processes. For example, a user may choose to compare a search query that was previously executed regarding a first product against a search query that was executed at a later time or currently being executed.

In step 220, a plurality of comparative search result groups are generated wherein each result group includes an element from the first search results and an element from the second search result. In one embodiment, the function expressed as Equation (1) may be used to estimate the likeliness that two pages form a comparative pair corresponding with two input queries $$fq1,q2(p1,p2)=\alpha \cdot R(p1,q1)+\beta \cdot R(p2,q2)+\gamma \cdot S(p1\backslash q1, p2\backslash q2) p1 \in SR1, p2 \in SR2 \quad \text{(Equation 1)}$$

where the function is utilized to generate comparative information for the input queries q1 and q2. The first approach is to automatically re-rank the search results returned by the search engine(s) ("SE") utilized in step 205 and 210. Assume "SR1" and "SR2" in the function represent the result pages corresponding to queries q1 and q2, performed in steps 205 and 210, respectively. Unlike traditional search functions which are commonly ranked by their relevance to the query, the function re-ranks SR1 and SR2 to display the comparative page groups, such as pairs as explained in more detail below. Assume "p1" and "p2" are two pages from SR1 and SR2 respectively. Using "R" to denote the relevance of a query to a page, and "S" to denote the similarity between two text segments, the function shown as Equation 1 may be used to estimate the likeliness that two pages form a comparative pair corresponding with two input queries.

In Equation 1, p1\q1 and p2\q2 denote the remaining text contents of page p1 and p2 after removing terms contained in q1 and q2 respectively. Therefore, S(p1\q1, p2\q2) measures the amount of comparative information of p1 and p2 associated with q1 and q2. The function f considers the relevance between pages and their corresponding queries, as well as the comparative information contained in the two pages. In one embodiment, parameter $\alpha$ and $\beta$ are set to be equal in order to make the relevance measures corresponding with the two queries are treated equally. $\gamma$ is a tradeoff parameter, balancing the relevance measure and the comparison measure.

The computation of f is based on the snippet text. All possible page pairs E={p1, p2|p1∈SR1, p2∈SR2} are ranked in decreasing order according to fq1, q2 (p1, p2). The pair with the highest rank will be selected as a comparative pair and both pages of this pair are inserted in set P. All the remaining page pairs will be filtered and those containing pages in P are removed from E. Then the second comparative pair is selected from the updated set E. This process iterates until no comparative pairs can be found from E. With this strategy, we can remove those pairs containing duplicate pages and rank all the comparative page pairs according to fq1, q2.

Figure 3:
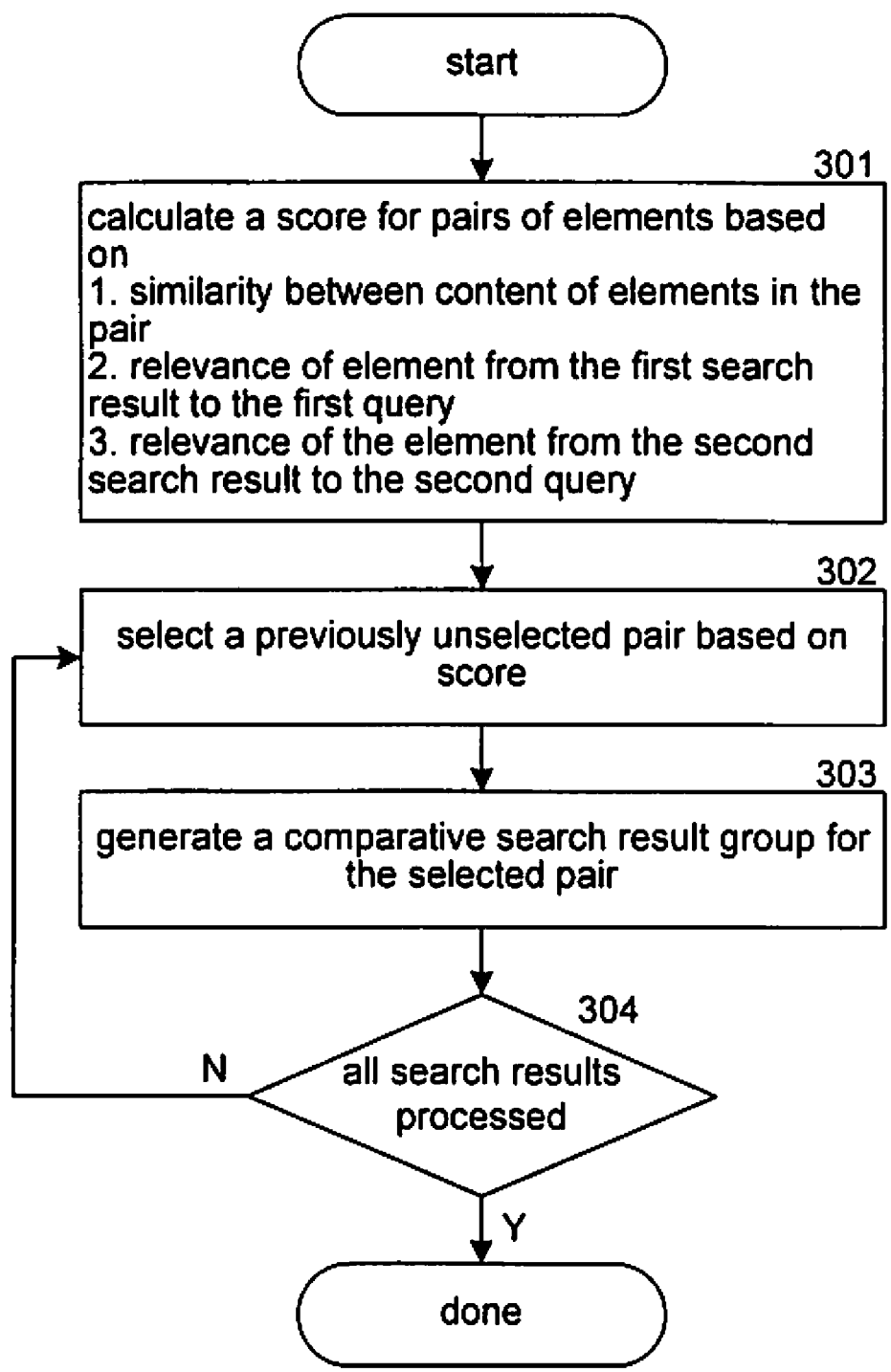
FIG. 3 is a flow diagram of an exemplary method for generating comparative result groups.

FIG. 3 is a flow diagram of an exemplary method for generating comparative result groups according to step 220. In exemplary step 301, a score is calculated which indicates the likeliness that the elements form a comparative pair corresponding to the first and second queries. The score is calculated according to Equation 1 and is based on similarity between content of the elements, relevance of the elements from the first search results to the first query, and relevance of the elements from the second search results to the second query. In exemplary step 302, a previously unselected pair of elements neither of whose elements are currently in a comparative search result is selected. The selection is based on the score calculated in step 301. In exemplary step 303, a comparative search result group with the elements from the selected pair is generated. Steps 302 and 303 may be repeated until all of the search results have been processed as indicated by step 304.

Upon completing step 220, step 225 and/or 230 may be initiated. If in step 225 it is determined that no similar comparative search result groups exist, then the processing continues at step 230. In step 230, it is determined whether to display at least one of the groups generated in step 220 in a pair wise manner. In one such embodiment, the user may be permitted to select an option to activate or deactivate the displaying of one or more of the groups in a pair wise manner. By "pair-wise" it is meant that at least one of the comparative result groups are associated for easy viewing on the display device. If so, step 245 may be implemented. If the user does not activate the option, the pair-wise display is not used as shown in step 231. Each pair contains comparative contents relevant with both input queries. For example, the first pair may be the homepages of Microsoft Xbox game console site and Playstation Global site. The second pair may contain the pages of IGN reviews.

In one embodiment, the dimensions of the web pages may be adjusted to fit both results within the group on a single display simultaneously. For example, one comparative result group for the above-referenced search may produce a comparative result group of composed of an MSN.com review of the Xbox® and an MSN.com review of the Playstation®. Both web pages may be adjusted to fit within a single display area. Yet, in a computing environment having multiple displays, the web pages may be displayed on different monitors or display devices. Yet in another embodiment, the web pages comprising the pair are tabbed within a single application, such that the user may easily compare the web pages in a pair wise manner by switching between the tabs. Indeed, any grouping that pairs the web pages together is within the scope of the invention. Moreover, one skilled in the art readily appreciates that two web pages were chosen to describe aspects of the invention for simplicity reasons in aiding the reader in understanding the scope of the invention, and that when more then two web pages form a comparative result group, that the results may be displayed in a fashion corresponding to the number of web pages (i.e., displayed in a trio when three web pages form the group).

Yet in another embodiment, only a portion of the relevant web pages may be extracted and displayed to the user (i.e., step 240). This embodiment may be implemented regardless if the results are displayed in a pair wise manner. For example, the extraction may comprise of text (and/or graphics) that occur within a predetermined proximity to the words searched in steps 205 and/or 210. In other embodiments, the extraction may comprise text and or graphics that occur within a predetermined proximity to the words that separate one grouping from another. For example, using the search queries above regarding the gaming devices, the comparative result groups may comprise price, consumer satisfaction, available games, etc. In one such embodiment, the user may be permitted to choose the predetermined proximity.

Step 225 may also be implemented, either in conjunction with or entirely independent of step 230. In step 225, it is determined whether similar comparative result groups exist in the results of step 220. For example, in one embodiment if the comparative result groups of step 220 comprise several pairs (or trios, etc.) each comprising information on the price of the searched gaming devices, then step 235 may be implemented. In step 235, the subset of the comparative search result groups that comprise the similar information are clustered.

In one such embodiment, step 240 is also implemented where a portion of the web pages may be extracted and displayed to the user. In one embodiment, where the subset of pages all concern pricing, the extraction technique may be used to display text from the results to the user to convey that cost is a common subject matter within that subset. In one implementation, a hyperlink or other selection mechanism may be generated for each subset that describes the common subject matter and allows the user to select the hyperlink to further investigate the web pages within the subset. In one example, upon selecting a certain subset, the user may determine whether the web pages within those pairs are to be selected in a pair wise manner as discussed in reference to step 230.

The present invention has been described in terms of exemplary embodiments. Numerous other embodiments, modifications and variations within the scope and spirit of the appended claims will occur to persons of ordinary skill in the art from a review of this disclosure. For example, one skilled in the art will appreciate different methods may be used to conduct the comparative search queries without departing from the scope of the invention. Moreover, one or more steps of the described methods may be omitted or duplicated, and in some instance performed in a different sequence than described above.

We claim:

1. A computer-implemented method performed by a computer for ranking comparative web results comprising the steps of:

receiving a first search query;

receiving a second search query that is related to the first search query; processing the first search query to produce first search results, the first search results having elements that are relevant to the first query, and processing the second search query to produce second search results, the second search results having elements that are relevant to the second query; and generating by the computer a plurality of comparative search result groups that each include an element from the first search results and an element from the second search results by calculating a score for pairs of elements with a first element of the pair being from the first search results and a second element of the pair being from the second search results, each score for a pair indicating likeliness that the elements form a comparative pair corresponding to the first and second queries, and being based on similarity between content of the elements of the pair, relevance of the first element to the first query, and relevance of the second element to the second query, the score being calculated according to the following equation:

$$f_{q1q2}(p1,p2)=\alpha \cdot R(p1,q1)+\beta \cdot R(p2,q2)+\gamma \cdot S(p1\backslash q1, p2\backslash q2), p1 \in SR1, p2 \in SR2$$

wherein SR1 represents the first search results for the first search query q1, SR2 represents the second search results for the second search query q2, p1 represents an element from SR1, p2 represents an element from SR2, R represents relevance of an element to a query, S represents similarity between two elements, p1\q1 represents text content of p1 after removing terms of q1, p2\q2 represents text content of p2 after removing terms of q2, and α, β, and γ represents constants; and repeatedly selecting in score order a previously unselected pair of elements neither of whose elements are currently in a comparative search result group and creating a comparative search result group with the elements of the selected pair.

2. The computer-implemented method of claim 1, wherein at least one of the search result groups is a pair of web pages.

3. The computer-implemented method of claim 2, further comprising the step of:
displaying the pair of web pages in a pair wise manner.

4. The computer-implemented method of claim 2, further comprising the steps of:
extracting at least one portion of each web page within the pair, the portion comprising at least one element from either the first or second search results.

5. The computer-implemented method of claim 1, wherein the first search query relates to a consumer product and the second search query relates to a similar consumer product.

6. The computer-implemented method of claim 1, further comprising the steps of:
determining that a subset of the plurality of comparative search result groups comprise similar information; and
clustering the subset into a cluster.

7. The computer-implemented method of claim 6, further comprising the step of:
extracting at least one portion of at least one element within the cluster, the at least one element being from either the first or second search results.

8. A computer-implemented method for obtaining comparative web results from a computing device operatively connected to a network through a browser comprising the steps of:
transmitting a first search query to obtain a first search result;
transmitting a second search query that is related to the first search query to obtain a second search result;
receiving at the computing results the plurality of comparative search result groups that each include a first element from the first search result and a second element from the second search result, the plurality of the comparative search result groups being generated based on the following equation:

$$f_{q1q2}(p1,p2)=\alpha \cdot R(p1,q1)+\beta \cdot R(p2,q2)+\gamma \cdot S(p1\backslash q1, p2\backslash q2), p1 \in SR1, p2 \in SR2$$

wherein SR1 represents the first search results for the first search query q1, SR2 represents the second search results for the second search query q2, p1 represents an element from SR1, p2 represents an element from SR2, R represents relevance of an element to a query, S represents similarity between two elements, p1\q1 represents text content of p1 after removing terms of q1, p2\q2 represents text content of p2 after removing terms of q2, and α, β, and γ represents constants wherein the elements are grouped based on relevance of the first element to the first search query and relevance of the second element to the second search query.

9. The computer-implemented method of claim 8, wherein at least one of the search result groups is a pair of web pages.

10. The computer-implemented method of claim 9, further comprising the step of:
displaying on a display device the pair of web pages to a user in a pair wise manner.

11. The computer-implemented method of claim 8, further comprising the step of:
displaying a cluster comprising a subset of the plurality of comparative search result groups that comprise similar information.

12. The computer-implemented method of claim 11, further comprising the step of:
displaying a summary of the information within the subset of the plurality of comparative search results, the summary comprising at least one element from either the first or second search results.

13. A computing device for ranking comparative web results, the device having a processor, and a computer-readable medium, the computer-readable medium comprising computer-readable instructions that when executed perform the method of:
receiving a first search query;
receiving a second search query that is related to the first search query;
processing the first search query to produce first search results and processing the second search query to produce second search results; and
generating a plurality of comparative search result groups that each include an element from the first search results and an element from the second search results based on the following equation:

$$f_{q1q2}(p1,p2)=\alpha \cdot R(p1,q2)+\beta \cdot R(p2,q2)+\gamma \cdot S(p1\backslash q1, p2\backslash q2), p1 \in SR1, p2 \in SR2$$

wherein SR1 represents the first search results for the first search query q1, SR2 represents the second search results for the second search query q2, p1 represents an element from SR1, p2 represents an element from SR2, R represents relevance of an element to a query, S represents similarity between two elements, p1\q1 represents text content of p1 after removing terms of q1, p2\q2 represents text content of p2 after removing terms of q2, and α, β, and α represents constants:
wherein the elements are grouped based on similarity between the content of the elements.

14. The computing device of claim 13, wherein at least one of the search result groups is a pair of web pages.

15. The computing device of claim 14, wherein the computer-readable instructions further comprise the step of:
extracting at least one portion of each web_page within the pair, the portion comprising including at least one element from either the first or second search results.

16. The computing device of claim 13, wherein the computer-readable instructions further comprise the steps of:
determining that a subset of the plurality of comparative search result groups comprise similar information; and
clustering the subset into a cluster.

* * * * *

UNITED STATES PATENT AND TRADEMARK OFFICE
CERTIFICATE OF CORRECTION

PATENT NO.       : 7,571,162 B2
APPLICATION NO. : 11/365961
DATED            : August 4, 2009
INVENTOR(S)      : Sun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 413 days.

Signed and Sealed this

Seventh Day of September, 2010

David J. Kappos
*Director of the United States Patent and Trademark Office*